US008229400B1

(12) United States Patent
Shenvi Kuncolienkar

(10) Patent No.: US 8,229,400 B1
(45) Date of Patent: Jul. 24, 2012

(54) GRANULAR CONTROL OVER ACCESS TO DATA BY A DEVICE

(75) Inventor: Shirish T. Shenvi Kuncolienkar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/185,540

(22) Filed: Jul. 19, 2011

(51) Int. Cl.
*H04M 1/66* (2006.01)
(52) U.S. Cl. ............. 455/411; 709/223; 713/182; 726/3
(58) Field of Classification Search .................. 455/411; 726/3, 221; 713/182, 153
See application file for complete search history.

(56) References Cited

U.S. PATENT DOCUMENTS

| 2005/0186977 | A1 | 8/2005 | Chiu et al. |
| 2007/0264981 | A1 | 11/2007 | Miller |
| 2008/0020803 | A1 | 1/2008 | Rios et al. |
| 2010/0299719 | A1* | 11/2010 | Burks et al. ........................ 726/3 |
| 2012/0040643 | A1* | 2/2012 | Diachina et al. .............. 455/411 |

OTHER PUBLICATIONS

Author unknown, "Phone Wallet v.3.0 for Series 60.3/60.5: Secure and organise your confidential data!", http://www.symbianguru.com/phone-wallet-3-0-for-series-60-3-60-5.html, 2011, pages and volume-issue unknown, SymbianGuru.com, city and/or country where published unknown.

CApp Plus, "App Protector Pro", http://www.appbrain.com/app/com.carrotapp.protectpronew, 2011, pages and volume-issue unknown, AppBrain, city and/or country where published unknown.
Author unknown, "App Protector Pro v1.28 SlideME version", http://slideme.org/application/app-protector-pro, Mar. 27, 2011, pages and volume-issue unknown, SlideME LLC, city and/or country where published unknown.
Author unknown, "Locktopus: Password Protect Your Individual iPhone Apps", http://www.ihackintosh.com/2010/08/locktopus-password-protect-your-individual-iphone-apps/, Aug. 9, 2010, pages and volume-issue unknown, iHackintosh, city and/or country where published unknown.
Author unknown, "Mobile Client Pledge", http://www.nordicedge.se/products/mobile-client-pledge#features, 2009, pages and volume-issue unknown, Nordic Edge AB, Nacka Strand, Sweden.

* cited by examiner

*Primary Examiner* — Phuoc Doan
(74) *Attorney, Agent, or Firm* — Thomas E. Lees, LLC

(57) ABSTRACT

Granular access control over data is provided. The access control can be on an individual entity, a group of entities or other data characterizations. Further, the control is not limited to data in folders, but can include contacts from a contact list, calendar entries, incoming calls, applications that can be accessed by the electronic device, etc. A new attribute is associated with a data characterization, designated an access level. Another attribute is associated with profiles stored on the electronic device, designated as a guard level. When a request for access to data is received, the electronic device allows access to the data if the value of the guard level associated with the active profile satisfies a predetermined access requirement relative to the value of the access level associated with the requested data.

20 Claims, 5 Drawing Sheets

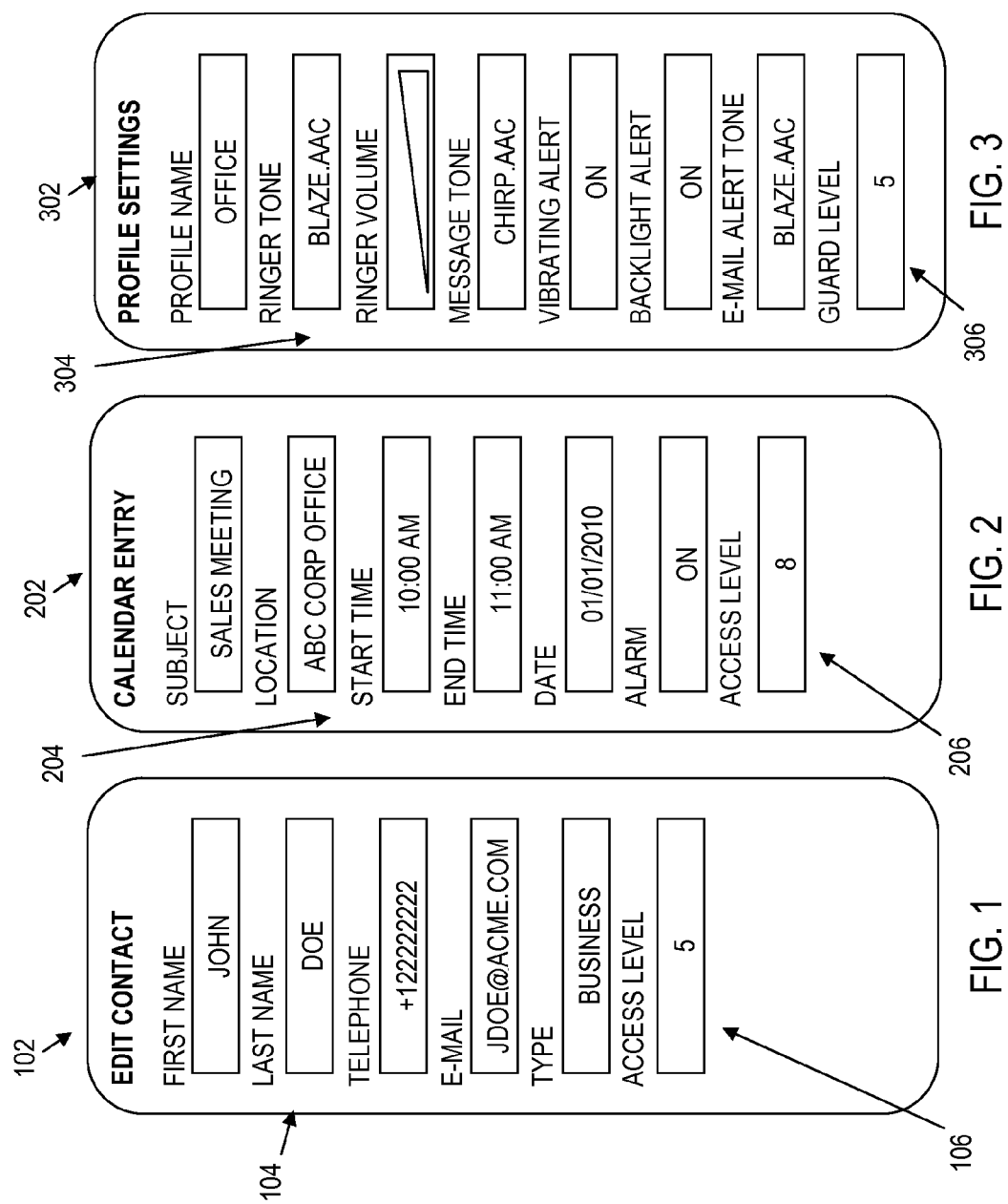

GRANULAR CONTROL OVER ACCESS TO DATA BY A DEVICE

BACKGROUND

Various aspects of the present invention relate generally to controlling access to data in electronic devices, and more particularly, to granular access control of data in electronic devices based upon an active profile.

Electronic devices available in the market usually include a memory for a user to store information such as personal data, communications, applications and media. For example, consider a mobile telephone. Most mobile telephones include a memory that allows the user to store contacts, text messages, e-mails, calendar entries, etc. Further, the memory on many mobile telephones allows the user to store applications and electronic media, such as, documents, pictures, videos, music, podcasts, etc. Still further, the memory of many mobile telephones can store different personalization settings for attributes such as the telephone ringer volume, vibrating/ringing mode, ring tone, video call tone, message tone, etc.

BRIEF SUMMARY

According to aspects of the present invention, control of access to information accessible in an electronic device comprises receiving, by an electronic device, a request to access data and comparing a value of a guard level associated with an active profile currently enabled on the electronic device, to a value of an access level associated with the requested data. Moreover, control of access to information comprises granting access to the data if the value of the guard level associated with the active profile satisfies a predetermined access requirement relative to the value of the access level associated with the requested data. Correspondingly, control of access to information comprises denying access to the requested data if the value of the guard level associated with the active profile does not satisfy the predetermined access requirement relative to the value of the access level associated with the requested data.

BRIEF DESCRIPTION OF THE SEVERAL VIEWS OF THE DRAWINGS

FIG. 1 is a schematic illustrating an exemplary contact record, including an access level attribute, according to various aspects of the present invention;

FIG. 2 is a schematic illustrating an exemplary calendar entry including an access level attribute, according to various aspects of the present invention;

FIG. 3 is a schematic illustrating an exemplary profile setting record including a guard level attribute, according to various aspects of the present invention;

FIG. 8 is a block diagram of a device having a computer readable storage medium for implementing functions according to various aspects of the present invention as described in greater detail herein.

DETAILED DESCRIPTION

Figure 4:
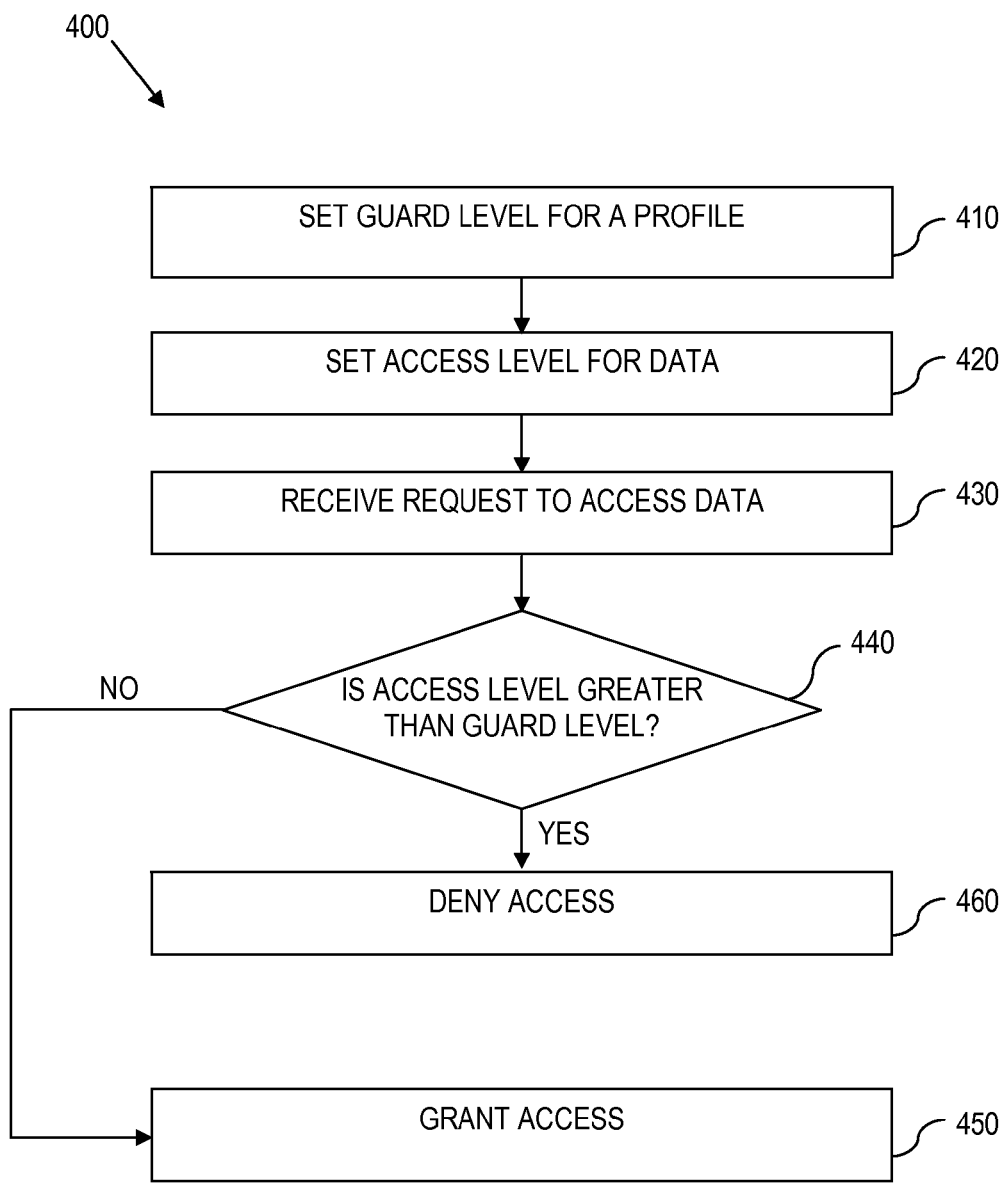
FIG. 4 is a flow chart illustrating an overall flow of using the access level and guard level attributes to determine whether to deny or grant access to data, according to various aspects of the present invention.

In the following detailed description, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of the present invention.

Aspects of the present invention control access to data requested by an electronic device. Some examples of requests for data include a request to display contacts from a contact list, a request to launch an application such as a web browser, a request to display entries on a calendar, a request to display an incoming call, etc. In an illustrative implementation, a determination is made as to whether to grant access to requested data based upon a value of a "guard level" associated with a profile that is currently enabled on an electronic device and a value of an "access level" associated with the requested data. As such, data that is accessible by an electronic device can be secured, as will be described in greater detail herein.

A profile defines parameters that affect how the electronic device operates when the respective profile is the current active profile or is otherwise enabled on the electronic device. As such, the electronic device may store multiple profiles. The user is able to switch among the profiles, making any one profile the currently active profile. In certain implementations, the profile may change based upon location, task, context, environment or other factors. In this regard, the user may change the active current profile, or the electronic device may be able to change the profile automatically, e.g., based upon sensing location, etc. Exemplary profiles may be defined as Silent, Vibrate, General, Outdoors, Meeting, Off-line, etc. Moreover, profiles can be defined by user-adjustable attributes. Thus, each profile represents a customization of the corresponding electronic device.

Further aspects of the present invention facilitate the characterization of data across multiple layers of abstraction such that different characterizations of the data can be associated with different access levels. For instance, aspects of the present invention facilitate assigning an access level value to various data characterizations so as to implement a granular access control scheme across data stored on the electronic device. By way of example, data comprising an address book can be characterized with a first access level, whereas a group or distribution list of contacts within the address book can have a different access level, and individual contacts can have yet a different access level. Thus, access control can be defined across individual elements of data, or across multiple levels, hierarchies, orders or other groupings of data, as will be described in greater detail herein.

In an illustrative implementation, an attribute, referred to herein as a "guard level", is associated with a profile that can be enabled on a corresponding electronic device. For instance, a user of a smart mobile telephone may enable a "work profile" that is associated with a first guard level. However, at a subsequent time, the user can switch to another profile, e.g., a "home profile", which is associated with a second guard level that is different from the first guard level.

A complementary attribute, referred to herein as an "access level", is associated with data accessible by the electronic device. The data with which the access level attribute is associated can be an individual data element or other data characterization, as noted above. For sake of example, assume that a single entity such as a specific work-related contact in an address book is assigned an access level attribute. Whenever there is a request received by the electronic device to access the work-related contact, the electronic device compares the value of the access level attribute associated with the work-related contact to the value of the guard level attribute associated with the currently enabled profile on the electronic device, e.g., the work profile, to determine whether to grant access to the requested data.

In illustrative implementations, the electronic device grants access to the requested data, e.g., the work-related contact, if the value of the guard level associated with the active profile satisfies a predetermined access requirement relative to the value of the access level associated with the requested data. Correspondingly, the electronic device denies access to the requested data if the value of the guard level associated with the active profile does not satisfy the predetermined access requirement relative to the value of the access level associated with the requested data. Examples of suitable access requirements are described in greater detail herein.

In an illustrative implementation, the electronic device is a smart mobile telephone that is used to access user data such as contacts, e-mail, calendars, etc. However, aspects described more fully herein can be implemented on any electronic device, and is thus not limited to mobile devices. In this regard, the data to be accessed may be stored on the electronic device, the data may be stored on a removable storage medium such as a flash drive that is currently coupled to the electronic device, the data may be accessible via a wired or wireless connection to the electronic device, etc.

Setting an Access Level:

Referring now to the figures, and in particular to FIG. 1, an exemplary interface 100 is illustrated for editing data implemented as a contact record 102. The contact record 102 is depicted as having a plurality of user-modifiable fields 104 that define the attributes of the contact record 102. For example, the contact record 102 includes attributes that a user may modify, including: First Name, Last Name, Telephone, E-mail, and Type.

As described briefly above, an attribute, designated herein as an access level, is used as part of a granular access control scheme that is implemented on an electronic device. For instance, an attribute designated as an "Access Level" 106 is provided to designate that the data, e.g., the contact record 102, should be subject to access control. In an illustrative implementation, the Access Level attribute has a value of any whole number. For instance, the access level of the exemplary contact has a value of 5 for sake of illustration herein.

In alternative implementations, the Access Level may be implemented using different, alternative indicia. By way of example, in certain alternative illustrative embodiments, the value of the Access Level is any number including any integer, any positive integer, etc. Moreover, in certain implementations, the greater the value of the access level, the more secure the data is, as will be described below.

The use of the access level is not limited to individual contacts or even individual records. As noted above, the Access Level attribute 106 can be extended across any characterization of the data supported by the underlying application. For instance, in addition to applying the Access Level attribute 106 to an individual entity, e.g., the contact record 102, a different access level attribute can be assigned for groups or distribution lists of contacts. Still further, yet a different access level attribute can be assigned for access to the entire contacts list.

As another non-limiting example, FIG. 2 illustrates a sample calendar entry, which may be stored in the memory of an electronic device, e.g., a smart mobile telephone. The exemplary calendar entry 202 includes attributes 204 that the user may modify: Subject, Location, Start Time, End Time, Date, and Alarm. Further, the calendar entry includes an Access Level attribute 206, which is analogous to the Access Level attribute 106 discussed with reference to FIG. 1. Keeping with the above-example, the Access Level attribute 206 can have a value of any whole number, integer or other indicia. The access level of the exemplary calendar entry has a value of 8.

The data illustrated in FIGS. 1 and 2 are exemplary and not meant to be limiting. As noted above, the granular capabilities of the access level attribute facilitate setting an access level at different levels of characterization of the data. For instance, access level attributes can be set for data such as applications accessible via a menu, message folders, group entries, individual files and folders, individual storage devices, etc. Moreover, access level attributes can be set for the data as a single entity (e.g., a contact, a calendar entry), a group of entities (e.g., all business contacts) or an entire file, database, etc. With the access level tied to a specific data entity or group of entities, as opposed to the entire device or folders on the electronic device, the electronic device can grant access to those entities on a more granular (i.e., finer) level.

As another example, access to an email program on a portable electronic device such as a smart mobile telephone can be tied to a first access level, whereas groups of emails, email folders, threads of emails and other logical groupings of email information can optionally have different access levels, and even individual emails can have their own access level, thus providing granular access control of data.

As another example, a value of an access level for a given contact in a phone book, contact list, etc., can be used to restrict access to all the communication data related to the contact. Communication data includes for instance, telephone calls made to and received from the contact, email communication with the contact, short message service (SMS) messages that have been exchanged with the contact, meetings scheduled with the contact, etc.

Correspondingly, a user of the portable electronic device can have a first profile for use when full access of email data is necessary, and at least one additional profile, e.g., a public profile when the user wishes to provide security to certain email entities. As a result, important business emails, email threads, email folders, etc., can be kept secure when the user is out in the public. However, the user can maintain access to the email program, etc., including user information and other relevant information.

In various embodiments, if there is a conflict between the access level of a single entity and the access level of a group to which the single entity belongs, the access level of the single entity prevails. For example, using the contact in FIG. 1, the value of the access level to the contact (single entity) is 5. However, assume for example, that the contact is part of a group of entities (business contacts), which (for this example) has an access level value of 3. When access is requested, the access level of the single entity prevails, i.e. an access level value of 5. Other rules may apply when the conflict exists such as: the higher access level prevails, the access level of the group prevails, or the lower access level prevails, etc.

Setting a Guard Level:

Referring now to FIG. 3, a sample profile is depicted. In practice, the user of an electronic device sets up one or more profiles. Typical attributes associated with the exemplary profile include: Profile Name, Ringer Tone, Ringer Volume, Message Tone, Vibrating Alert, Backlight Alert, and E-mail Alert Tone. The user can set values for each of the attributes of the profile. A "guard level" attribute is also associated with the profile. As with the access level attribute of the data, the guard level may have a value of any whole number in some embodiments. In other embodiments, the value of the guard level may be any number including any integer, any positive integer, other indicia, etc. The guard level of the exemplary profile is 5.

The guard level value for a profile indicates the access rights available to the user when that profile is active or otherwise enabled on the electronic device. Thus, in an exemplary implementation, a user with a currently active or otherwise enabled profile can access data that has an access level value less than or equal to the guard level value of the profile. As used herein, an access level value less than or equal to the guard level value means that the currently enabled profile has a guard level sufficient to grant access rights to the requested data. That is, the guard level value of the active profile meets a predetermined requirement to grant access when considered in view of the value of the access level of the requested data. Correspondingly, the guard level value of the active profile would not meet the predetermined requirement to grant access where the value of an access level associated with requested data is greater than the guard level of the active profile.

For instance, in an illustrative, but non-limiting example, the access level and guard level are established by whole numbers where the higher the number, the greater the security level (for the access level) and the higher the security clearance (for the guard level). Keeping with this exemplary implementation, and considering FIGS. 1-3, a user logged into an electronic device using a current active profile of OFFICE (as depicted in FIG. 3), could access the contact information for JOHN DOE (as depicted in FIG. 1) because the value of the guard level for the OFFICE profile is 5 and the value of the access level for the contact JOHN DOE is 5. On the other hand, the user cannot access the calendar entry for the SALES MEETING (as depicted in FIG. 2) because the value of the guard level for the OFFICE profile is 5 and the value of the access level for the SALES MEETING is 8. Accordingly, the user, operating a portable electronic device such as a smart mobile telephone, can keep the sales meeting secure until the user logs into the portable electronic device using a profile that has a guard level value of 8 or more.

Usage Rules of Guard Level and Access Level Attributes:

According to aspects described more fully herein, a value of a guard level associated with an active profile currently enabled on the electronic device is compared to a value of an access level associated with the requested data to determine whether the comparison satisfies a predetermined access requirement, e.g., relative to the value of the access level associated with the requested data. Examples of access requirements are set out below.

A guard level value for a profile indicates the access rights available to the user when the profile is active. In an illustrative example, a profile with a guard level value of zero has minimal or no access.

Correspondingly, and Access level value for any data within the electronic device indicates that the data is accessible to the user when the active profile on the electronic device has a guard level greater than or equal to the access level. Accordingly, in an illustrative example, data will be available to any profile if that data has an Access Level value of zero, no Access Level attribute at all, where a check for an Access Level attribute returns a NIL or does not exist value, etc.

The utilization of a guard level and an access level facilitate the ability to define any number of rules to specify the interaction between a profile and corresponding data. For instance, in an illustrative example, any data that is not accessible, e.g., the guard level of the current profile is less than the access level of the data in the above-example, will not be visible to the user. Alternative implementations and/or rules may also be implemented.

As an example where the electronic device comprises a mobile telephone within a contacts list, the user may define emergency contacts within the contact list to have an access level value of zero. Correspondingly, business contacts within the contact list may be defined as an access level value of 5. The call log for telephone calls received may have an access level value of 4. Finally, a browser application may have an access level value of 3. Assume that there are three profiles stored on the electronic device designated as profile-1 having a guard level value of 5, profile-2 having a guard level value of 3 and profile-3 having a guard level value of zero.

When profile-1 is active, emergency contacts, the browser application, the call log and the business contacts will all be accessible because the guard level of profile-1 is equal to or greater than the access level value associated with all of the above defined data. Correspondingly, if the user switches the current profile to profile-2, then emergency contacts and the browser application will be accessible but the call log and business contacts will not be accessible because the guard level value of 3 is less than the access level value of the call log and business contacts. Finally, in this example if the user switches the current profile to profile-3, then only emergency contacts will be accessible, because the guard level value for profile 3 is zero, which is less than the access level value of all of the above data except for the emergency contacts.

In an illustrative implementation, when a user purchases an electronic device such as a mobile telephone, one or more default profiles may be provided which have an initial guard level value set to zero. Moreover, software may be used to initialize various data characterizations to have an access level value of zero. The user can then change the guard level and or access levels to different values depending upon the security desired.

In an illustrative implementation, whenever a user needs to access information which has a higher access level than the currently active profile guard level, the user needs to switch to a profile which has sufficiently high guard level value.

For instance, if the electronic device denies access to requested data, e.g., if the value of the guard level associated with the active profile is insufficient to satisfy the predetermined access requirement relative to the value of the access level associated with the requested data, then the electronic device may further prompt for a switch to another profile stored on the device with a higher security clearance value, e.g., a profile having a higher guard level attribute value.

In an illustrative implementation, if the guard level of the profile that the user wants to switch to is higher than that of the active profile guard level, the user is required to enter a pin number in order to complete the switch to the new profile. However, a pin number, password or other authentication may not be required when shifting to a profile that has a guard level value lower than the guard level value of the active profile.

Exemplary Methods of Changing the Guard Level and Access Level:

In an illustrative implementation, the electronic device receives a request to change the value of a guard level for a select profile stored on the electronic device. For instance, the request can include a requested guard level value. In this regard, a graphical user interface or other arrangement prompts the user for the requested guard level before software on the electronic device requests the change. In order to determine whether to change the guard level value associated with a profile, the system compares the requested guard level value to the current guard level value and grants the request to change the guard level value to the requested guard level value if the requested guard level value is less than the current guard level value. Alternatively, the system verifies whether the request to change is allowed if the requested guard level value is greater than the current guard level value, such as by prompting the user to verify that the user has authorization to change the value of the current guard level, by receiving an authorization input and by granting the request to change the current guard level value to the requested guard level value if the received authorization input matches a predetermined authorization value, e.g., a predetermined PIN code.

In an illustrative example, the access level for any data is changed using a user interface that is provided such the all the active profiles with their guard levels are listed in ascending order of their guard level values. In this exemplary configuration, the user is able to choose the correct profile that is necessary to be able access the data. All the profiles following this profile in the displayed list will also have access to the data since the profiles are in order by guard level value Now referring to FIG. 4, a flow chart illustrates an overall method 400 for determining whether to grant access to data based upon a guard level and an access level. The method 400 may be implemented, for instance, as computer code executed by a processor of an electronic device. For instance, where the electronic device comprises a mobile telephone, the method 400 may be implemented as a lightweight process or other process, agent, application, or other code running on the electronic device's operating system. Further, the method 400 may be implemented as computer code stored on a tangible, computer-readable storage medium such that when the code is read out and executed by a processor, the electronic device implements the method 400.

At 410, the guard level is set for a profile. In various embodiments, the initial value for the guard value of a profile is set to a default value, such as a default value of zero (0). Changing the guard level value of a profile is explained in greater detail with reference to FIG. 5 below. In an illustrative implementation, the guard level is defined as a by setting a value of a guard level attribute associated with the profile. The guard level attribute may be physically stored with the other profile attributes. Alternatively, the guard level attribute may be remotely stored from, but linked to the profile, e.g., using a relational association. Moreover, setting a guard level at 410 can be repeated for multiple profiles. In this regard, the profile used for purposes of providing granular access control is based upon the profile selected as the current active or otherwise enabled profile.

At 420, the access level is set for data. As mentioned above, the data can be a single entity, e.g., a piece of data, a data element, etc., or a group of entities such as a group of data elements, records or other forms of data. In illustrative embodiments, the initial value for the access level assigned to corresponding data is set to a default value, such as a default value of zero (0). Changing the access level value associated with corresponding data is explained in greater detail with reference to FIG. 6 below. In illustrative implementations, the data associated with an access level attribute can comprise user-selected data, e.g., email and calendar information, or any data characterization, including information, programs, applications, documents, media files, etc.

At 430, the method 400 receives a request to access a specific characterization of data associated with an access level attribute. The request can take many forms. For example, when a user opens up the contacts list on the electronic device, the request is a request to display the contacts of the list. In a further example, when a user opens up the calendar on the electronic device, the request is to display the entries in the calendar. In yet a further example, when the electronic device receives an incoming call, the request is a request to display the identification of the caller, to allow the electronic device to alert the user that a call is incoming, or a combination thereof. Still further, the request may be to open a file, media or other data.

Regardless, the requested data comprises data that is stored on an electronic device, such as a portable electronic device, or is otherwise accessible by a corresponding electronic device, and has an access level value associated therewith. Correspondingly, the request for data is implemented on an electronic device having a currently active or otherwise enabled guard level value. The examples given are not meant to be limiting; the request can take other forms than the examples provided.

At 440, the electronic device compares the value of the access level of the requested data and the value of the guard level of the current profile. If the value of the access level of the requested piece of data is not greater than (i.e., less than or equal to) the value of the guard level of the current profile, then the user is granted access to the requested data at 450. If the value of the access level of the requested piece of data is greater than the value of the guard level of the current profile, then in certain embodiments, the user is denied access to the requested data at 460. In several embodiments, at 460 the user is prompted to switch to another profile. In various alternative embodiments, at 460 the method 400 performs some other predetermined action. As noted previously, the requirement of the guard level being equal to or greater than the access level of requested data is purely for illustration in an exemplary implementation where increasing whole numbers designate increased security.

When used herein, such an example should be understood to mean that the comparison designates that the guard level is sufficient to grant a security clearance to allow access to the requested data.

Using the non-limiting examples from FIGS. 1 and 3, at 410 the active profile (i.e., current profile) is set to a guard level value of 5, and at 420 a contact in the contacts list is set to an access level value of 5. At 430, during use where the profile of FIG. 3 is set as the current active profile, the user attempts to open up the contact list on the electronic device, which creates a request to access the contact of FIG. 1. To determine whether the contact will be displayed to the user at 440, the electronic device compares the value of the access level of the contact (5 in this example) to the value of the guard level of the current profile (also 5 in this example). Here, the value of the access level is equal to (i.e., not greater than) the value of the guard level; thus, the user is granted access to the contact at 450, and the electronic device displays the contact in the contact list for the user.

In a similar non-limiting example, using the examples from FIGS. 2 and 3, at 410 the active profile (i.e., current profile) is set to a guard level value of 5, and at 420 a calendar entry is set to an access value of 8. At 430, during use where the profile of FIG. 3 is set as the current active profile, the user opens up the calendar on the electronic device, which creates a request to access the calendar entry of FIG. 2. To determine whether the calendar entry will be displayed to the user at 440, the electronic device compares the value of the access level of the calendar entry (8 in this example) to the value of the guard level of the current profile (5 in this example). Here, the value of the access level is greater than the value of the guard level; therefore, the user is denied access to the calendar entry, and the electronic device does not display the calendar entry on the calendar. Alternatively, the electronic device may prompt the user to log in with a different profile to access the requested data. Still further, the electronic device may prompt the user with a warning, with an error message, or the calendar event may be hidden from view entirely without suggesting that the information is even stored on the electronic device (or is otherwise accessible by the electronic device).

Figure 5:
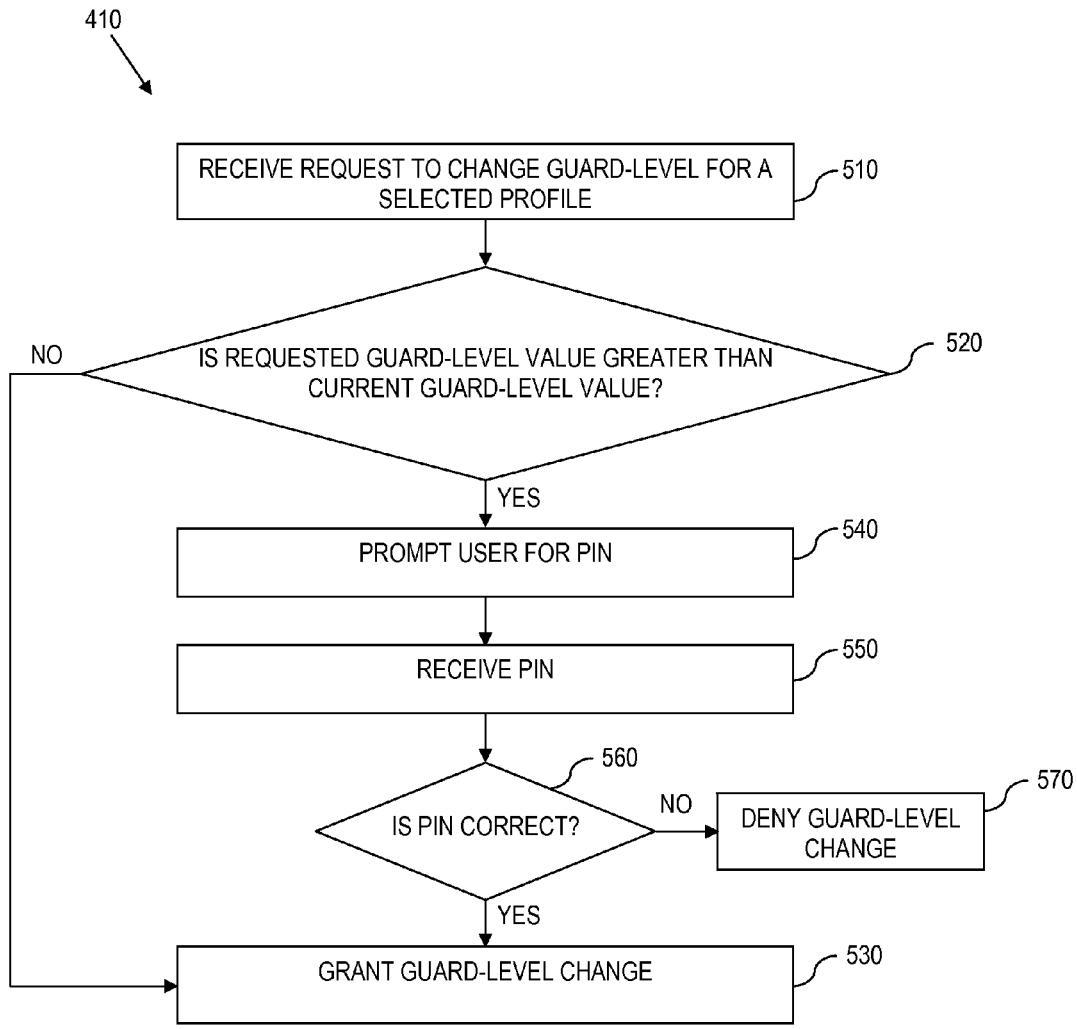
FIG. 5 is a flow chart illustrating changing the guard level for a profile on the electronic device, according to various aspects of the present invention.

Referring now to FIG. 5, a flow chart illustrates setting up the guard level (410, FIG. 4) of a profile. The method 500 may be implemented, for instance, as computer code executed by a processor of an electronic device. For instance, where the electronic device comprises a portable smart mobile telephone, the method 500 may be implemented as a lightweight process or other process, agent, application, or other code running on the electronic device's operating system. Further, the method 500 may be implemented as computer code stored on a tangible, computer-readable storage medium such that when the code is read out and executed by a processor, the electronic device implements the method 500.

At 510, the electronic device receives a request to change the guard level associated with a selected profile. The selected profile may be the current profile or another profile stored on the electronic device. At 520, the electronic device compares the requested guard level value to the current guard level value. If the requested guard level value is the same as or lower in security, then the request is granted to change the guard level. Keeping with the example of using whole numbers where the larger the number, the higher the security, if the requested guard level value is not greater than (i.e., less than or equal to) the current guard level value, then the electronic device grants the guard level change at 530. However, if the requested guard level value is greater than the current guard level value then the electronic device prompts the user for permission to increase the guard level. In an exemplary implementation, the user is requested to enter a predetermined personal identification number (PIN) or other authentication that is associated with the electronic device, or that is otherwise associated with a guard level greater than or equal to the requested guard level at 540.

At 550, the electronic device receives a personal identification number and compares the received personal identification number to the predetermined personal identification number at 560. If the personal identification numbers match, then the electronic device grants the guard level change at 530. However, if the personal identification numbers do not match, then in illustrative embodiments, the electronic device denies the request to change the guard level at 570. In alternative embodiments, at 570 the electronic device prompts the user for another personal identification number; and in certain further alternative embodiments, at 570 the electronic device performs some other predetermined action, e.g., displays a warning, locks out the device, etc.

In further alternative embodiments, at 560 the electronic device compares the received personal identification number with multiple predetermined personal identification numbers associated with profiles with a guard level greater than or equal to the requested guard level.

In some embodiments, when a user wants to switch profiles within the electronic device, the electronic device follows the same method as depicted in FIG. 5. Further, this process can be used with automatic profile switching, which is described in U.S. Patent Publication No. 2005/0186977 entitled "Automated Switching of User Notification Profiles in a Mobile Device" by Chiu et al., the entirety of which is incorporated by reference.

Moreover, software in the electronic device can be executed to change a current value of an access level associated with a selected data characterization. For instance, in an illustrative example, software receives a request to change the current value of the access level of the selected data characterization. In a manner analogous to that guard level example above, a graphical user interface can be used to obtain a new access level value from a user. The software grants the request to change the value of the current access level if the requested access level value is less than the current access level value of the selected data characterization. Alternatively, the software verifies the requested change if the requested access level value is greater than the current access level value. To verify the requested access level change, the software prompts the user to verify that the user has authorization to change the value of the current access level in a manner analogous to that set out more fully herein. For instance, the system receives an authorization input and grants the request to change the current guard level value to the requested guard level value if the received authorization input matches a predetermined authorization value.

Figure 6:
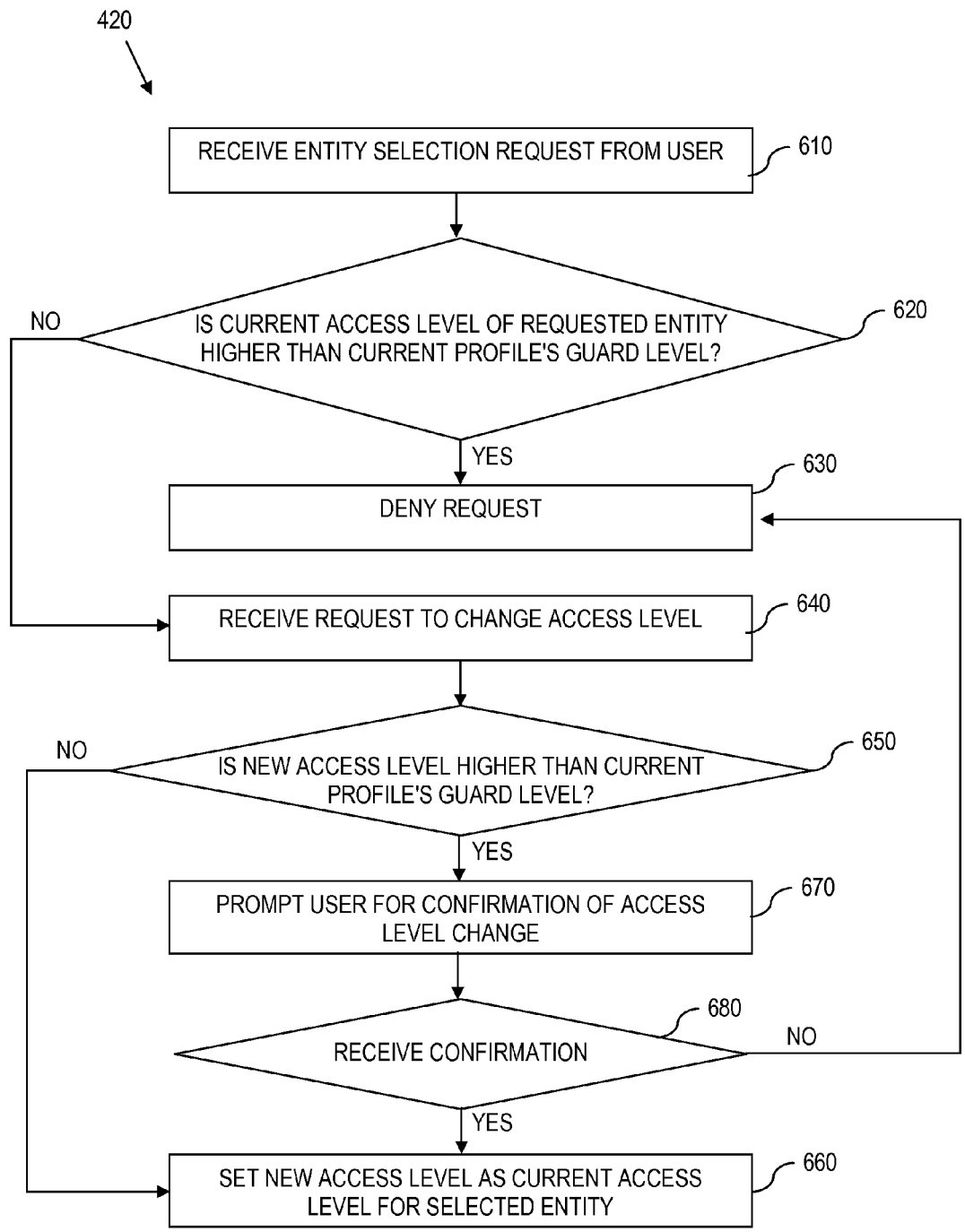
FIG. 6 is a flow chart illustrating setting the access level for pieces of data at a granular level on the electronic device, according to various aspects of the present invention.

Turning now to FIG. 6, a flow chart illustrating setting up the access level (420, FIG. 4) for a piece of data is depicted. At 610, the electronic device receives a request to select an entity or group of entities (collectively, piece of data) of which the user wants to change the access level. At 620, the electronic device compares the current access level value of the requested entity to the guard level value of the current profile. If the current access level value is not greater than (i.e., less than or equal to) the guard level value, then the electronic device allows the request to select the entity, and the method proceeds to 640. If the current access level value is greater than the guard level value of the active profile, then in illustrative embodiments, the electronic device denies the request to select the entity at 630. In some embodiments, at 630 the electronic device prompts the user to switch profiles. In various embodiments, at 630 the electronic device alternatively or additionally performs some other predetermined action.

At 640, the electronic device receives a request to change the access level of the selected piece of data. At 650, the electronic device compares the requested access level value to the guard level value of the current profile. If the requested access level value is not greater than (i.e., less than or equal to) the guard level value of the active profile, then the electronic device allows the request to change the access level of the selected piece of data at 660. If the requested access level value is greater than the guard level value of the active profile, then the electronic device prompts the user for verification of the access level change at 670, because the user will no longer have access to the piece of data at the current guard level if device allows the request to change the access level.

If, at 680, the electronic device receives confirmation of the change, then the electronic device allows the request to change the access level of the selected piece of data at 660. However, if at 680, the electronic device does not receive a confirmation or receives an indication to revoke the requested change, then in illustrative embodiments, the electronic device denies the request to change at 630. In certain embodiments, at 630 the electronic device prompts the user to switch profiles. In other embodiments, at 630 the electronic device performs some other predetermined action.

Receiving Wireless, Real-Time Communications:

According to aspects of the present invention, access control is provided for mobile computing devices, over real-time communications, e.g., telephone calls, e-mails, texts, instant messages, etc. For instance, a mobile electronic device receives an incoming call from a person that has contact information accessible by the electronic device, where the contact information has an associated access level value assigned thereto. Software executing on the mobile device compares a value of a guard level associated with an active profile currently enabled on the electronic device, with the access level value associated with the contact information. The software grants access to the data (e.g., text message, incoming telephone call, e-mail, etc.,) if the value of the guard level associated with the active profile satisfies a predetermined access requirement relative to the value of the access level associated with the requested data. Alternatively, the software denies access to the requested data if the value of the guard level associated with the active profile is insufficient to satisfy the predetermined access requirement.

In response to denying the request, the software may prompt the operator to authorize accepting the incoming call, e.g., by prompting the operator for an authorization input, comparing a received authorization input value to a predetermined authorization value and allowing access to the call if the authorization input matches the predetermined authorization value. As another illustrative example, denying access to the requested data may be implemented by allowing access to the incoming call without displaying contact information where such contact information would otherwise be displayed if access were granted.

Similarly, receiving a request to access data may comprise receiving notification of a missed communication from a person that has contact information accessible by the electronic device. In an illustrative example, the handling of the missed call is analogous to that of an incoming communication.

Figure 7:
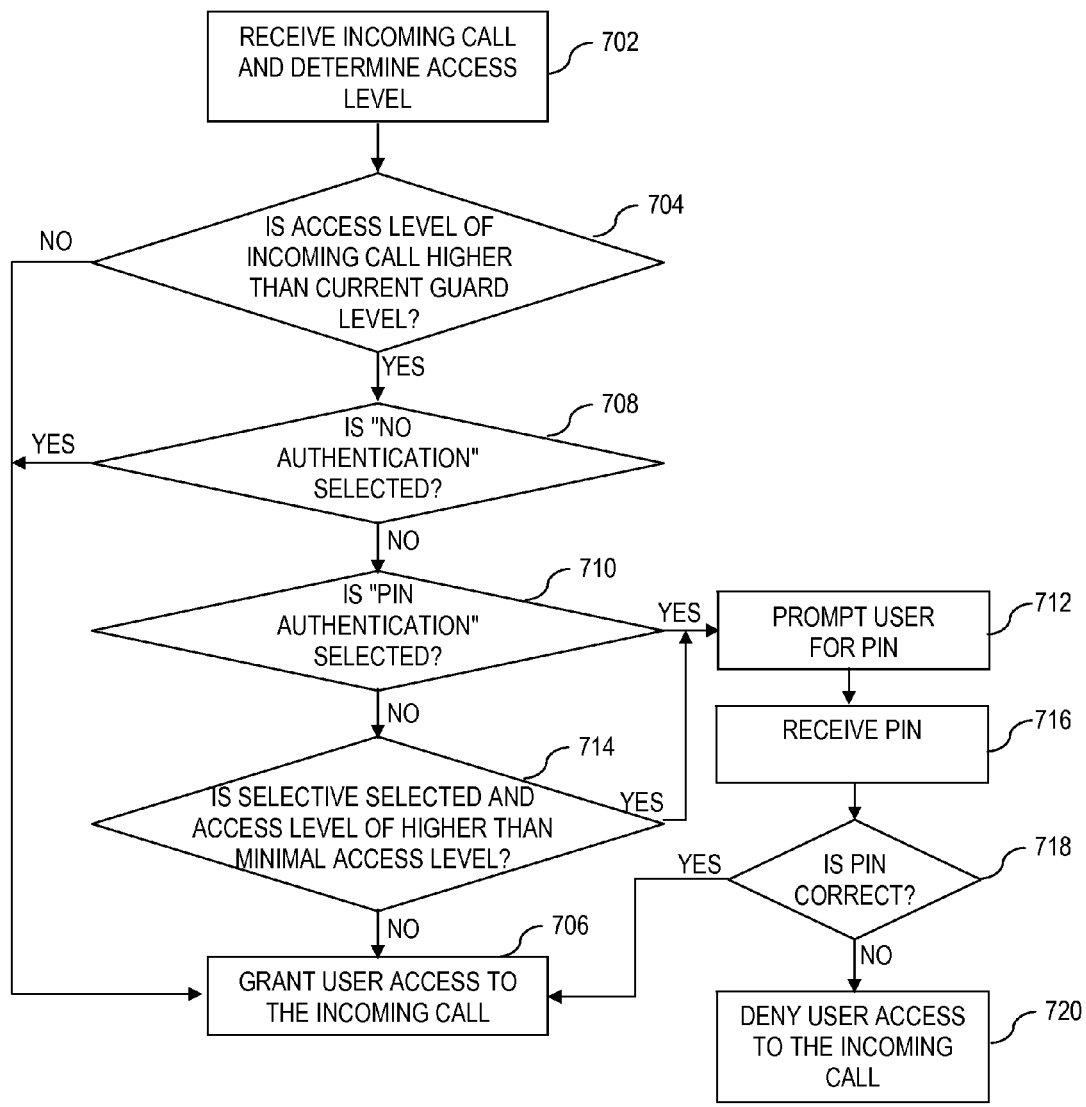
FIG. 7 is a flow chart illustrating using the access level and guard level with an incoming call, according to various aspects of the present invention.

Referring now to FIG. 7, a flow chart illustrates exemplary approaches for attending to an incoming data communication when the electronic device has cellular, network, wireless network, or other suitable communication capabilities. An incoming data communication may take many forms of electronic communication including a phone call, video chat call, a text message, a request for a chat, an e-mail, etc. In various embodiments, when the electronic device has such communication capabilities, the present invention adds another set of attributes that are associated with either the profile settings or the electronic device settings.

According to aspects of the present invention, a set of attributes includes a choice of processes to attend to an incoming call and an action for unattended calls. For example, the choices of processes are mutually exclusive and include: no authorization required, personal identification number authentication, and selective authentication. These choices are explained in greater detail below. As another example, the actions for unattended calls include sending a message to the caller, the owner of the phone, or both.

At 702, the electronic device receives an incoming communication, e.g., a telephone call for purposes of illustration. The electronic device searches the contacts list to determine if the caller is in the contacts list and has an access level attribute. If the caller is in the contacts list with an access level attribute, then the electronic device will use that access level for the handling the incoming call. If the caller is not in the contacts list or does not have an access level, then in several embodiments, the electronic device applies a default value for the access level for handling the incoming call. For example, if a caller is not on the contacts list, then the electronic device assigns an access level of zero (0).

At 704, the electronic device compares the value of the access level of the incoming call to the value of the current guard level. If the access level value is not greater than (i.e., less than or equal to) the guard level value, then the electronic device grants access to the user at 706. In some embodiments, allowing access includes displaying the identification of the caller (if available). If the access level value is greater than the guard level value, then the electronic device proceeds to 708.

At 708, the electronic device determines if the user has selected an option that does not require authorization. If the user has selected that option, then the electronic device grants access to the user at 706. In various embodiments, allowing access includes displaying the identification of the caller (if available). If the user has not selected the no authorization required option, then the electronic device proceeds to 710.

At 710, the electronic device determines if the user has selected the personal identification number authentication. If the user has selected that option, then the electronic device prompts the user to enter a predetermined personal identification number associated with a profile with a guard level value greater than or equal to the access level value of the caller at 712. If the user has not selected the personal identification number authorization option, then the electronic device proceeds to 714.

At 714, the electronic device determines if the user has selected the selective authorization option and the predetermined minimal access level requirement associated with that option. With the selective authorization option, the user sets a minimal access level requirement, which indicates the minimum access level where authorization is required. All incoming calls with an access level less than or equal to the minimum access level are automatically granted. Therefore, if the access level value of the incoming call is not greater than (i.e., less than or equal to) the predetermined minimal access level requirement, then the electronic device grants access to the user at 706. However, if the access level value of the incoming call is greater than the predetermined minimal access level requirement, then the electronic device prompts the user to enter a predetermined personal identification number associated with a profile with a guard level value greater than or equal to the access level value of the caller at 712. The access level value of the incoming call here stands for the access level value of the contact from whom the call is received.

In some embodiments, the electronic device does not determine if a final option (the selective authorization option in this example) is selected and just assumes that the final choice is selected if none of the other options are implemented, similar to a subtractive decode. In other embodiments, the electronic device determines which option is selected in parallel as opposed to the serial implementation of the example above.

Independent of whether the electronic device arrived at 712 through 710 or 714, the electronic device prompts the user to enter a predetermined personal identification number associated with a profile with a guard level value greater than or equal to the access level value of the caller. At 716, the electronic device receives a personal identification number.

At 718, the electronic device compares the received personal identification number to the predetermined personal identification number. If the personal identification numbers match, then the electronic device grants the incoming call at 706. However, if the personal identification numbers do not match, then in certain embodiments, the electronic device denies the access to the incoming call at 720. In alternative embodiments, at 720 the electronic device prompts the user for another personal identification number; and in some embodiments, at 720 the electronic device performs some other predetermined action. In various embodiments when the electronic device does not allow the incoming call, the electronic device does not alert the user of the incoming call.

In illustrative embodiments, at 718 the electronic device compares the received personal identification number with multiple predetermined personal identification numbers associated with profiles with a guard level values greater than or equal to the requested guard level value.

The process for retrieving messages left by unattended calls is similar to the process described in FIG. 4, where the piece of data is the message. For instance, in an illustrative example in this call from a contact which has an access level value greater than or equal to the guard level value of the currently active profile would be displayed normally. For other calls from a contact which has an access level value less than or equal to the guard level value, the user may be notified about the existence of the caller message but the details are not shown on the display. For viewing the hidden message, the user will be required to switch the profile in order to see details.

According to aspects described herein, granular access control of requested data is provided. The use of a guard level associated with an active profile, and an access level associated with requested data, along with the ability to characterize data granularly based upon the nature of the data of interest, facilitates the ability to provide security without the need to password protect specially designated folders. Moreover, aspects of the present invention avoid the need to password protecting subscriber identity module (SIM) card password locks that would otherwise require a smart phone or other device to get locked when not in use/timed out.

For instance, granular access control described more fully herein, can be utilized to restrict access to data characterizations, such as an incoming message, an application such as a browser application or any other installed application, a document stored in the memory, a log of phone communication, an e-mail application, media such as photos, videos, etc., physical devices such as camera, audio player, video recorder, etc., installed on the electronic device.

According to various aspects of the present invention, data stored on an electronic device can be restricted. However, since the data restrictions apply to applications, restrictions can also be imposed upon data that is remotely accessed, e.g., wirelessly, by controlling access to the application, wireless interface or other enabling mechanism that facilitates access to the remote data.

Still further, aspects of the present invention may be implemented where a request to access data is received by an application executing on the electronic device, at a hardware interface, at the operating system level, etc.

Further, various aspects described herein, allow a user to designate information that is acceptable for public viewing, e.g., emergency contact information, non-sensitive medical and other useful information so that such information can be accessed regardless of the priority of the active or otherwise enabled profile. For instance, where an access level attribute is specified as a whole number with higher security designated by a relatively higher value, emergency and other designated public information can be assigned an access level of zero (0). Comparatively, if a mobile telephone is locked using a conventional technique, e.g., by a PIN code, then the public information may not be accessible, e.g., in the case of an emergency where the user of the mobile telephone is unable to unlock the phone by entering the PIN code.

Still further, various aspects described herein allow a user to protect access to select data, e.g., only a few contacts in a contact list that require heightened security by assigning relatively higher access levels for those more secure contacts. Similarly, a user may want an email or text message in-box to filter messages such that messages from a certain contact is not visible in the reader application in certain contexts, e.g., when the user has currently enabled a home profile, or public profile. Still further, a user may elect to restrict access to a browser or other software application, but only when traveling or when using a public profile.

Referring to FIG. 8, a block diagram of a data processing system is depicted in accordance with the present invention. The data processing system 800 may comprise a symmetric multiprocessor (SMP) system or other configuration including a plurality of processors 802 connected to system bus 806. Alternatively, a single processor 802 may be employed. Also connected to system bus 806 an interface to local memory 804. An I/O bus bridge 808 is connected to the system bus 806 and provides an interface to an I/O bus 810. The I/O bus may be utilized to support one or more buses and corresponding devices, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter, storage, and a computer usable storage medium having computer usable program code embodied thereon. The computer usable program code may be executed to implement any aspect of the present invention, for example, to implement any aspect of any of the methods and/or system components illustrated in FIGS. 1-7. Moreover, the computer usable program code may be utilized to implement any other processes that are associated with granular control over access to data, or other aspects as set out further herein.

Although the examples herein set forth an access rule that requires the profile attribute to be greater than or equal to the data attribute to grant access to the data, embodiments alternatively implement an opposite arrangement. For instance, in an alternative arrangement, in order to grant access to the data, the data attribute must be greater than or equal to the profile attribute. Still further, other schemes may be utilized to determine whether the guard level value of the currently enabled profile is sufficient to access the requested data in view of the access level value of the associated data.

Further, while the examples set forth in this disclosure are directed towards electronic devices, and in particular, mobile telephones, alternative embodiments may utilize other electronic devices such as a computer, server, portable data assistant, laptop computer, netbook computer, tablet computer, personal music players, televisions, digital video recorders, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A method for controlling access to information accessible by an electronic device, the method comprising:
   receiving, by an electronic device, a request to access data;
   comparing a value of a guard level associated with an active profile currently enabled on the electronic device, to a value of an access level associated with the requested data;
   granting access to the data if the value of the guard level associated with the active profile satisfies a predetermined access requirement relative to the value of the access level associated with the requested data; and
   denying access to the requested data if the value of the guard level associated with the active profile does not satisfy the predetermined access requirement relative to the value of the access level associated with the requested data.

2. The method of claim 1, further comprising:
   prompting for a switch to another profile stored on the device with a higher security clearance value associated with the guard level if the value of the guard level associated with the active profile is insufficient to satisfy the predetermined access requirement relative to the value of the access level associated with the requested data.

3. The method of claim 1, further comprising:
   receiving a request to change the value of a guard level for a select profile stored on the electronic device, the request including a requested guard level value;
   comparing the requested guard level value to the current guard level value;
   granting the request to change the guard level value to the requested guard level value if the requested guard level value is less than the current guard level value; and
   verifying whether the request to change is allowed if the requested guard level value is greater than the current guard level value, wherein verifying includes:
      prompting to verify that a user has authorization to change the value of the current guard level;
      receiving an authorization input; and
      granting the request to change the current guard level value to the requested guard level value if the received authorization input matches a predetermined authorization value.

4. The method of claim 1, further comprising:
   changing a current value of an access level associated with a selected data characterization by:
      receiving a request to change the current value of the access level of the selected data characterization;
      granting the request to change the value of the current access level if the requested access level value is less than the current value of the access level of the selected data characterization; and
      verifying the requested change if the current value of the access level is greater than the current value of the access level, wherein verifying the requested change includes:
         prompting to verify that a user has authorization to change the value of the current access level;
         receiving an authorization input; and
         granting the request to change the current guard level value to the requested guard level value if the received authorization input matches a predetermined authorization value.

5. The method of claim 1, wherein receiving a request to access data comprises receiving a request to access at least one of:
   a contact in a contact list;
   a subset of contacts in the contact list;
   a missed incoming call;
   an incoming message;
   an application;
   a document stored in the memory;
   a log of phone communication;
   an email application;
   media; and
   a physical device.

6. The method of claim 5, wherein receiving a request to access data comprises receiving the request by an application executing on the electronic device.

7. The method of claim 1, wherein:
   receiving a request to access data comprises receiving an incoming communication from a person that has contact information accessible by the electronic device, where the contact information has an associated access level value assigned thereto;
   comparing a value of a guard level associated with an active profile currently enabled on the electronic device, to a value of an access level associated with the requested data comprises comparing the guard level value of the currently enabled profile with the access level value associated with the contact information;
   granting access to the data if the value of the guard level associated with the active profile satisfies a predetermined access requirement relative to the value of the access level associated with the requested data comprises allowing access to the incoming communication; and
   denying access to the requested data if the value of the guard level associated with the active profile is insufficient to satisfy the predetermined access requirement relative to the value of the access level associated with the requested data comprises:
      prompting the user to authorize accepting the incoming communication by:
         prompting the user for an authorization input;
         comparing a received authorization input value to a predetermined authorization value; and
         allowing access to the communication if the authorization input matches the predetermined authorization value.

8. The method of claim 1, wherein:
   receiving a request to access data comprises receiving an incoming communication from a person that has contact information accessible by the electronic device, where the contact information has an associated access level value assigned thereto;
   comparing a value of a guard level associated with an active profile currently enabled on the electronic device, to a value of an access level associated with the requested data comprises comparing the guard level value of the currently enabled profile with the access level value associated with the contact information;
   granting access to the data if the value of the guard level associated with the active profile satisfies a predetermined access requirement relative to the value of the access level associated with the requested data comprises allowing access to the incoming communication; and
   denying access to the requested data if the value of the guard level associated with the active profile is insufficient to satisfy the predetermined access requirement relative to the value of the access level associated with the requested data comprises:

allowing access to the incoming communication without displaying contact information where such contact information would otherwise be displayed if access were granted.

9. The method of claim 1, wherein:

receiving a request to access data comprises receiving notification of a missed communication from a person that has contact information accessible by the electronic device, where the contact information has an associated access level value assigned thereto;

comparing a value of a guard level associated with an active profile currently enabled on the electronic device, to a value of an access level associated with the requested data comprises comparing the guard level value of the currently enabled profile with the access level value associated with the contact information;

granting access to the data if the value of the guard level associated with the active profile satisfies a predetermined access requirement relative to the value of the access level associated with the requested data comprises allowing access to information about the missed communication; and denying access to the requested data if the value of the guard level associated with the active profile is insufficient to satisfy the predetermined access requirement relative to the value of the access level associated with the requested data comprises:

identifying the existence of the missed communication: and prompting the user to switch to a profile having a higher guard level.

10. The method of claim 1, further comprising:

assigning an access level value to various data characterizations so as to implement a granular access control scheme across data stored on the electronic device.

11. A computer-readable storage medium with an executable program stored thereon, wherein the program, when executed, instructs a microprocessor to perform:

receiving, by an electronic device, a request to access data;

comparing a value of a guard level associated with an active profile currently enabled on the electronic device, to a value of an access level associated with the requested data;

granting access to the data if the value of the guard level associated with the active profile satisfies a predetermined access requirement relative to the value of the access level associated with the requested data; and denying access to the requested data if the value of the guard level associated with the active profile does not satisfy the predetermined access requirement relative to the value of the access level associated with the requested data.

12. The computer-readable storage medium of claim 11, wherein the executable program is further programmed for:

prompting for a switch to another profile stored on the device with a higher security clearance value associated with the guard level if the value of the guard level associated with the active profile is insufficient to satisfy the predetermined access requirement relative to the value of the access level associated with the requested data.

13. The computer-readable storage medium of claim 11, wherein the executable program is further programmed for:

receiving a request to change the value of a guard level for a select profile stored on the electronic device, the request including a requested guard level value;

comparing the requested guard level value to the current guard level value;

granting the request to change the guard level value to the requested guard level value if the requested guard level value is less than the current guard level value; and verifying whether the request to change is allowed if the requested guard level value is greater than the current guard level value, wherein verifying includes:

prompting to verify that a user has authorization to change the value of the current guard level;

receiving an authorization input; and granting the request to change the current guard level value to the requested guard level value if the received authorization input matches a predetermined authorization value.

14. The computer-readable storage medium of claim 11, wherein the executable program is further programmed for:

changing a current value of an access level associated with a selected data characterization by:

receiving a request to change the current value of the access level of the selected data characterization;

granting the request to change the value of the current access level if the requested access level value is less than the current value of the access level of the selected data characterization; and verifying the requested change if the current value of the access level is greater than the current value of the access level, wherein verifying the requested change includes:

prompting to verify that a user has authorization to change the value of the current access level;

receiving an authorization input; and granting the request to change the current guard level value to the requested guard level value if the received authorization input matches a predetermined authorization value.

15. The computer-readable storage medium of claim 11, wherein the executable program is further programmed for:

receiving a request to access data by receiving a request to access at least one of:

a contact in a contact list;
a subset of contacts in the contact list;
a missed incoming call;
an incoming message; and
an application;
a document stored in the memory;
a log of phone communication;
an email application;
media; and
a physical device.

16. The computer-readable storage medium of claim 11, wherein the executable program is further programmed for:

receiving a request to access data by receiving the request by an application executing on the electronic device.

17. The computer-readable storage medium of claim 11, wherein the executable program is further programmed for:

receiving a request to access data by receiving an incoming communication from a person that has contact information accessible by the electronic device, where the contact information has an associated access level value assigned thereto;

comparing a value of a guard level associated with an active profile currently enabled on the electronic device, to a value of an access level associated with the requested data by comparing the guard level value of the currently enabled profile with the access level value associated with the contact information;

granting access to the data if the value of the guard level associated with the active profile satisfies a predetermined access requirement relative to the value of the access level associated with the requested data by allowing access to the incoming communication; and denying access to the requested data if the value of the guard level associated with the active profile is insufficient to satisfy the predetermined access requirement relative to the value of the access level associated with the requested data by:
- prompting the user to authorize accepting the incoming communication by:
  - prompting the user for an authorization input;
  - comparing a received authorization input value to a predetermined authorization value; and
  - allowing access to the communication if the authorization input matches the predetermined authorization value.

18. The computer-readable storage medium of claim 11, wherein the executable program is further programmed for:
- receiving a request to access data by receiving an incoming communication from a person that has contact information accessible by the electronic device, where the contact information has an associated access level value assigned thereto;
- comparing a value of a guard level associated with an active profile currently enabled on the electronic device, to a value of an access level associated with the requested data by comparing the guard level value of the currently enabled profile with the access level value associated with the contact information;
- granting access to the data if the value of the guard level associated with the active profile satisfies a predetermined access requirement relative to the value of the access level associated with the requested data by allowing access to the incoming communication; and
- denying access to the requested data if the value of the guard level associated with the active profile is insufficient to satisfy the predetermined access requirement relative to the value of the access level associated with the requested data by:
  - allowing access to the incoming communication without displaying contact information where such contact information would otherwise be displayed if access were granted.

19. The computer-readable storage medium of claim 11, wherein the executable program is further programmed for:
- receiving a request to access data by receiving notification of a missed communication from a person that has contact information accessible by the electronic device, where the contact information has an associated access level value assigned thereto;
- comparing a value of a guard level associated with an active profile currently enabled on the electronic device, to a value of an access level associated with the requested data by comparing the guard level value of the currently enabled profile with the access level value associated with the contact information;
- granting access to the data if the value of the guard level associated with the active profile satisfies a predetermined access requirement relative to the value of the access level associated with the requested data by allowing access to information about the missed communication; and
- denying access to the requested data if the value of the guard level associated with the active profile is insufficient to satisfy the predetermined access requirement relative to the value of the access level associated with the requested data by:
  - identifying the existence of the missed communication: and prompting the user to switch to a profile having a higher guard level.

20. A method for controlling access to information accessible by an electronic device, the method comprising:
- storing a minimal access level value, wherein the minimal access level corresponds to a minimum level for which no authentication is required to answer an incoming communication;
- receiving an incoming communication from a person that has contact information accessible by the electronic device, where the contact information has an associated access level value assigned thereto;
- comparing a value of the access level associated with the contact information with the minimum access level value;
- granting access to the incoming communication if the value of the access level associated with the contact information is equal to or less than the minimum access level; and
- prompting the user to authorize accepting the incoming communication if the value of the access level associated with the contact information is greater than the minimum access level by:
  - prompting the user for an authorization input;
  - comparing a received authorization input value to a predetermined authorization value; and
  - allowing access to the call if the authorization input matches the predetermined authorization value.

* * * * *